March 2, 1943.   W. H. FRANK ET AL   2,312,634
SWITCH
Filed July 25, 1940   3 Sheets-Sheet 2

INVENTORS
William H. Frank &
Lawrence E. Fisher
Daniel G. Cullen
ATTORNEY.

March 2, 1943.  W. H. FRANK ET AL  2,312,634
SWITCH
Filed July 25, 1940  3 Sheets-Sheet 3

INVENTOR.
WILLIAM H. FRANK
LAWRENCE E. FISHER.
BY
Daniel G. Cullen
ATTORNEY.

Patented Mar. 2, 1943

2,312,634

UNITED STATES PATENT OFFICE 2,312,634

SWITCH

William H. Frank and Lawrence E. Fisher, Detroit, Mich., assignors to Bulldog Electric Products Company, Detroit, Mich., a corporation of West Virginia Application July 25, 1940, Serial No. 347,514

11 Claims. (Cl. 200—163)

This application discloses a switch having a front operated rocker handle connected to a bail in turn detachably fastened to a plurality of movable switching heads.

An embodiment of the invention is described in the specification which follows and in the appended drawings.

Figure 1:
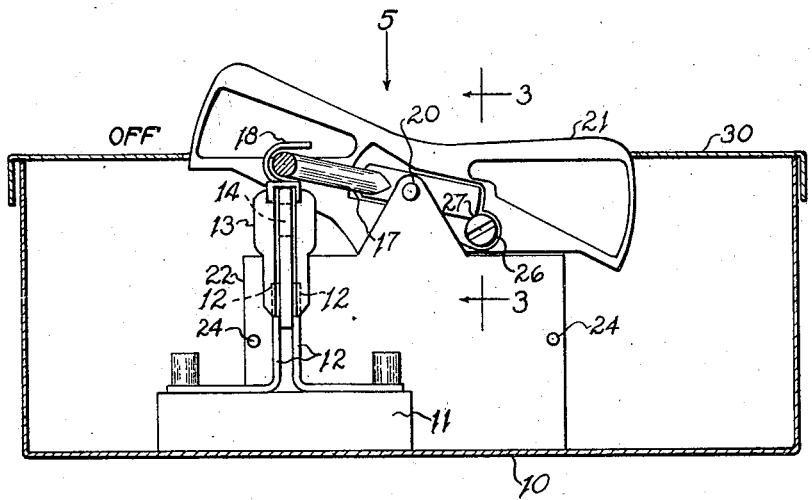
Fig. 1 is a fragmentary view of the switch, with parts omitted, shown in the open circuit or "off" position.
Figure 2:
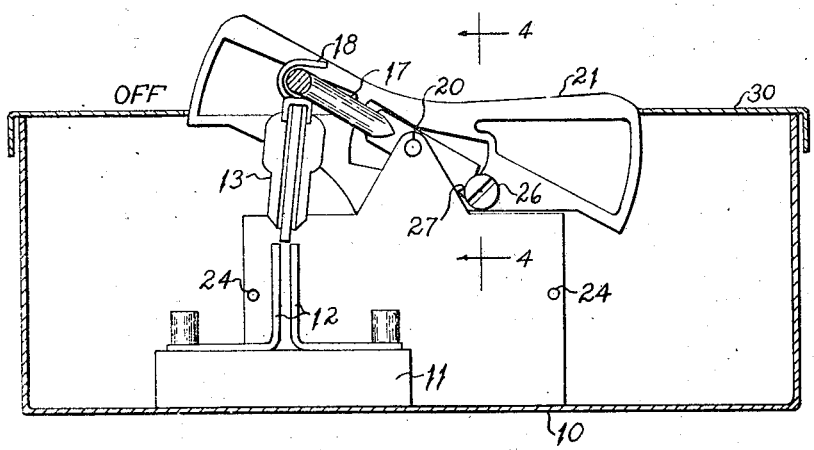
Fig. 2 is a view like Fig. 1 but showing the bail partly disconnected from the handle and the heads swung clear of the prongs.
Figure 3:
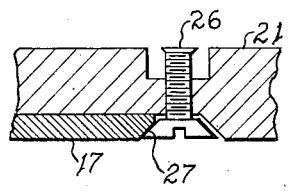
Figs. 3 and 4 are transverse detail views of the detachable connection between the bail and the handle.
Figure 4:
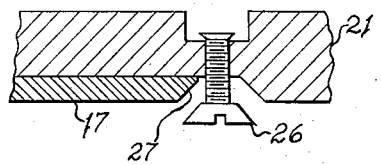
Figure 5:
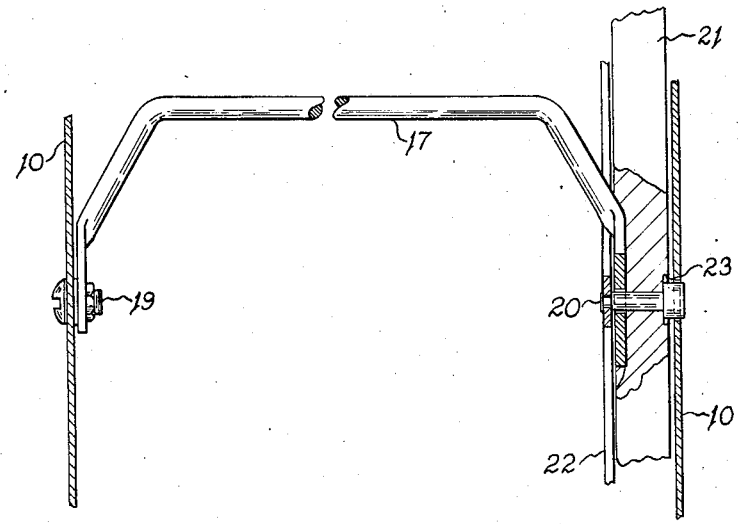
Fig. 5 shows the bail and handle mounting.
Figure 6:
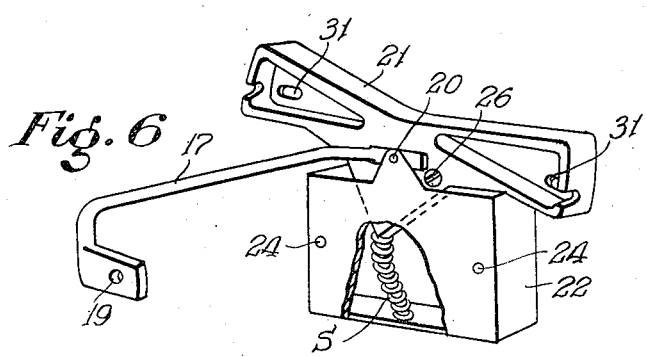
Fig. 6 shows the bail and handle sub-assembly.
Figure 7:
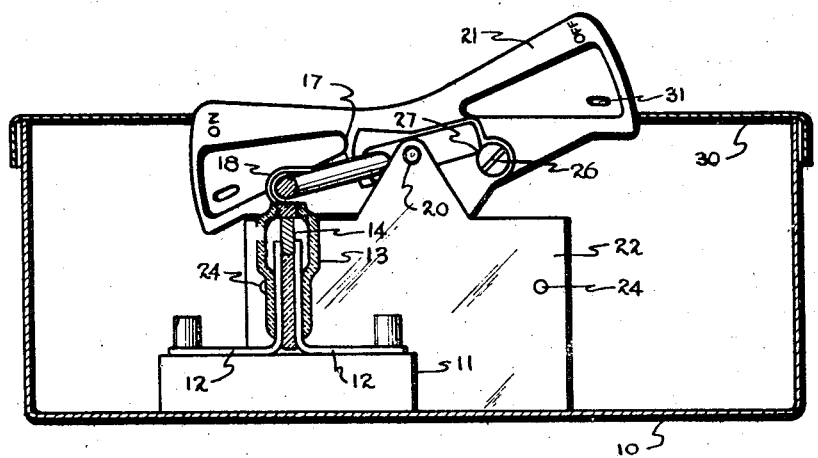
Fig. 7 is a view like Fig. 1 but showing the parts in closed circuit or "on" position.
Figure 8:
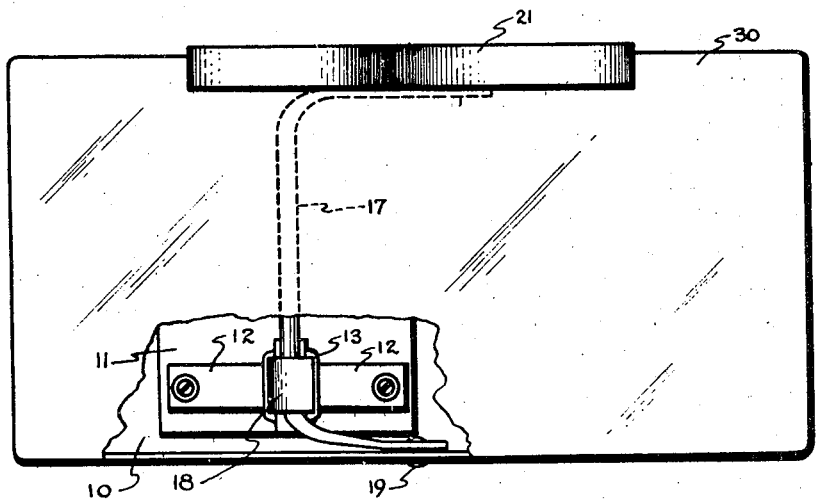
Fig. 8 is a partial plan view, cut away.

The switch shown comprises a sheet metal box 10 on the back of which is mounted an insulating base 11 equipped with stationary contact prongs 12 over which telescope the movable contact heads 13. These have in them movable contacts 14 which electrically interconnect the prongs when the heads are moved as far as possible towards the box back by the operating bail 17 which is shown as removably received within open sided hooks 18 connected to the forward ends of the heads.

The bail is bent in a manner common to operating bails for switches, as indicated, and has one of its end journalled and mounted at 19 on one side of the box. The other end of the bail is fastened by means of a pivot pin 20 to a handle 21 and to a housing 22. One end of the pin 20 seats within a hole 23 of the box side and the other seats within a hole in the housing which is secured to the box side so that the handle, which is of the rocker or push-only no-pull type, may be pivotally mounted on such side of the box.

The housing contains within it an over center spring S having one end fastened to the handle and the other end reaching on the back of the box. The housing receives the shanks of screws 24 which pass through the side of the box with their headed ends outside so that the housing may be detachably secured to the box side.

The housing, the spring therewithin, the handle, and the bail form a sub-assembly of unitary character which may be assembled with respect to the box and to the movable contact heads to complete the switch.

The headed end of a screw 26 threaded into the handle, when threaded down occupies a cut away corner 27 of the bail and thus prevents undesired relative motion between the bail and handle. When threaded out, however, it permits the bail to be swung with respect to the handle, so that heads 13 may be swung clear of the prongs for inspection, removal or replacement.

Rocking of the handle on its pivot axis will cause rotation of the bail about its journal line with snap action being assured by the over center spring.

The handle may be manipulated only by a push from the hand of the operator on either end exposed through a slot near the side edge of the box cover 30 and handle movement may not be restrained or inhibited by the operator, once initiated. The handle 21 has padlock hasp slots 31.

Now having described the switch hereof, reference should be had to the claims hereof which point out and distinctly define the invention.

We claim:

1. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle, and means for preventing undesired relative motion between bail and handle, the parts being so constructed that on release of the last named means, the bail may be swung relative to the handle.

2. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle.

3. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle, and a housing permanently attached to the handle and containing said spring, the handle, bail, spring, and housing forming a sub-unit which can be mounted as a unit in a box, in an operation separate from that of connecting the bail to the movable contact.

4. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle, the handle sides being marked with position indicators, one of which is normally exposed and the other normally concealed.

5. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle, the handle being formed so that it can be locked in a selected position.

6. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle, and a housing permanently attached to the handle and containing said spring, the handle, bail, spring, and housing forming a sub-unit which can be mounted as a unit in a box, in an operation separate from that of connecting the bail to the movable contact, the handle sides being marked with position indicators, one of which is normally exposed and the other normally concealed, the handle being formed so that it can be locked in a selected position.

7. A switch comprising a box having a sidewall, an open front, a cover therefor, and a back, a stationary contact on the back of the box and projecting forwardly therefrom, a movable contact for engaging or leaving said stationary contact, a bail parallel to and movable towards and away from said back, and connected to said movable contact, and a rocker push-only type handle disposed in a slot of the cover and pivotally mounted on the box side on an axis parallel to the bail and rigidly and permanently connected thereto for moving it, and a snap action spring for said handle, and a housing plate, a pin forming a permanent connection between the handle, a bail end, and the housing, and formed to rotate in a hole in the housing, and in a hole in the box sidewall for pivoting the handle and bail, and means securing the housing to the box side wall.

8. A switch comprising a box having a back, a stationary contact on the back of the box and projecting forwardly therefrom, a movable contact for engaging or leaving said stationary contact, and an operating means for the movable contact comprising a bail parallel to and movable towards and away from said back, a rocker push-only type handle rigidly connected to one end of the bail, a spring for giving snap action to the handle, and a housing surrounding the spring and detachably fastened to one box side, the housing, bail end, and handle being permanently fastened together, to form a unit, by a pin on the handle journalling it and the bail end in said box side and housing, there being a pin in another box side journalling the other end of the bail.

9. A switch comprising a box having a back, a stationary contact on the back of the box and projecting forwardly therefrom, a movable contact for engaging or leaving said stationary contact, and an operating means for the movable contact comprising a bail parallel to and movable towards and away from said back, a rocker push-only type handle rigidly connected to one end of the bail, a spring for giving snap action to the handle, and a housing surrounding the spring and detachably fastened to one box side, the housing, bail end, and handle being permanently fastened together, to form a unit, by a pin on the handle journalling it and the bail end in said box side and housing, there being a pin in another box side journalling the other end of the bail, the housing being spaced from the box side so that the housing and box side provide spaced bearings for the axis of rotation of the handle.

10. In a switch having a movable contact, an operating mechanism therefor comprising a bail connected thereto, and a pivotally mounted rocker push-only type handle rigidly and permanently connected thereto for moving it, and a snap action spring for said handle.

11. In a switch having a movable contact, an operating mechanism therefor comprising a bail connected thereto, and a pivotally mounted rocker push-only type handle rigidly and permanently conected thereto for moving it, and a snap action spring for said handle, the connection between the bail and the contact being formed to provide for limited relative motion of the bail and contact, and means independent of the bail for guiding the contact in its movement by the bail so that the contact moves in a guided path moving relative to as well as with the bail.

WILLIAM H. FRANK.
LAWRENCE E. FISHER.